United States Patent [19]
Glenn

[11] Patent Number: 5,625,489
[45] Date of Patent: Apr. 29, 1997

[54] PROJECTION SCREEN FOR LARGE SCREEN PICTORIAL DISPLAY

[75] Inventor: William E. Glenn, Ft. Lauderdale, Fla.

[73] Assignee: Florida Atlantic University, Boca Raton, Fla.

[21] Appl. No.: 590,916

[22] Filed: Jan. 24, 1996

[51] Int. Cl.[6] .................................................. G03B 21/60
[52] U.S. Cl. ........................ 359/455; 359/443; 359/451; 264/134; 264/136
[58] Field of Search ........................... 359/443, 451, 359/455; 264/1.34, 1.36, 234

[56] References Cited

U.S. PATENT DOCUMENTS 3,462,214  8/1969  Glenn ................................ 353/38
3,463,954  8/1969  Glenn ................................ 350/123

Primary Examiner—Safet Metjahic
Assistant Examiner—Daniel P. Malley
Attorney, Agent, or Firm—James H. Beusse

[57] ABSTRACT

A front projection screen for pictorially displaying upon a front face of the screen an image projected onto the front face from a projector comprises a backing member having a front reflective surface and a polarization rotation plate overlaying the reflective surface for rotating the plane of polarization of light reflected from the surface. A sheet of lenticular lenses overlays the polarization rotation plate and a polarizing film overlays the lenticular lens sheet. The polarizing film has non-polarizing segments at a focal point of each of the lenticular lenses so that light from the projector is not attenuated by the film while light from other sources is attenuated.

11 Claims, 2 Drawing Sheets

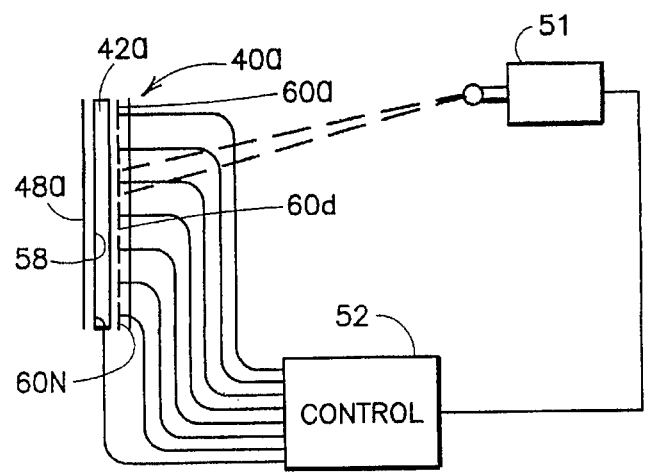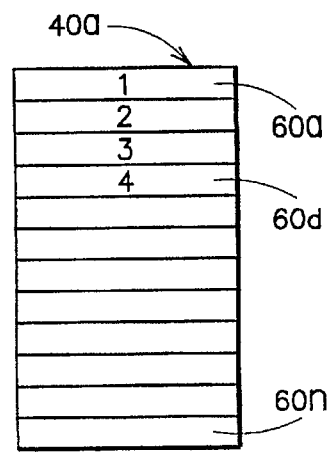
FIG. 5    FIG. 6
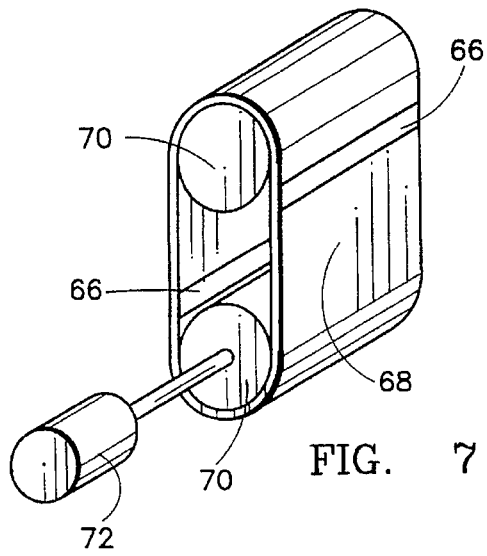
FIG. 7
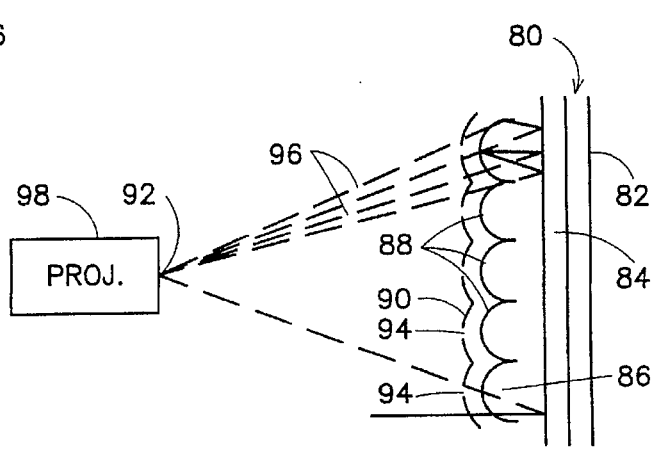
FIG. 8
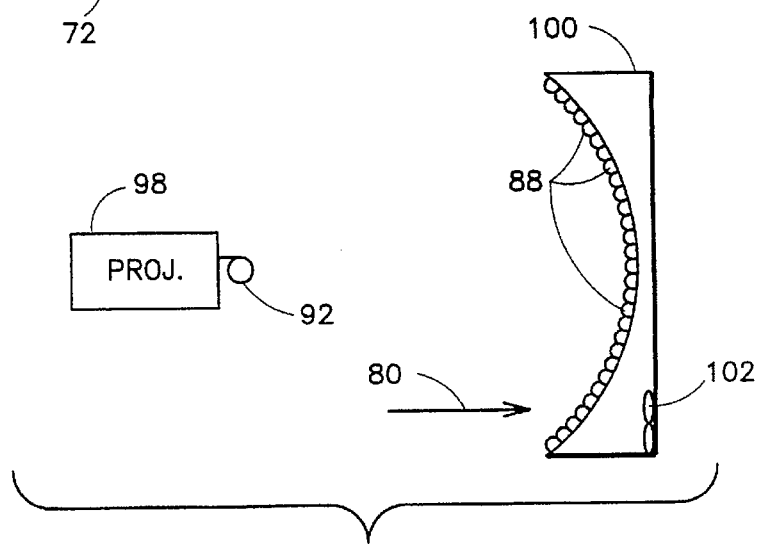
FIG. 9

PROJECTION SCREEN FOR LARGE SCREEN PICTORIAL DISPLAY

BACKGROUND OF THE INVENTION

The present invention relates to pictorial display devices such as television devices and, more particularly, to a method and apparatus for improving contrast ratio and light output of projection type display devices.

Projection type pictorial display devices generally are classified as rear or back projection screens and front projection screens. With back projection screens, an image is displayed upon the selectively darkened front face of the screen by projection onto the back face of the screen. In front projection devices, an image is projected directly onto the front face of a screen from the front face. Back projection systems are generally preferable if space is available behind the screen since the contrast ratio with high ambient light levels is higher. Front projection screens are used in other applications in which the projectors must be placed forward and spaced from the screen, such as, for example, in systems used for passenger viewing in large commercial aircraft. However, in any type of projection system the primary concern is with how to improve contrast and picture quality in the presence of ambient lighting.

U.S. Pat. Nos. 3,523,717 and 3,462,214 describe one form of back projection screen formed as a composite structure having refracting lens components and focusing lens components integrally formed within the surface of the screen. The focusing lens components are situated along the back face of the projection screen proximate the image to be viewed and the radius of curvature of the focusing lens components are so dimensioned relative to the thickness of the screen that the foci of the focusing lens components are located along the front face of the screen. Refracting lens components are formed in the screen in optical registry with the focusing lens components and the front face of the screen is covered with a darkened overcoating at all locations except the foci of the focusing lens components. The alignment of the refracting lens components with the focusing lens components inhibits the formation of moire while the incorporation of both lens components upon a single projection screen reduces multiple reflections between the surfaces of the aligned lenses. Because the focusing lens components forming the back face of the projection screen are small, e.g., preferably cylindrical lenses less than 50 mils in arcuate span, effective optical registration of the refracting lens components and the focusing lens components generally can be accomplished only by the formation of both the refracting lens components and the focusing lens components in a single projection screen.

It is desirable to coat the front surface of the screen with a dark or light impervious overlayer at all points except the foci of the focusing lens components to provide for the high contrast necessary for high quality pictorial displays. More particularly, by coating the front face of the screen at all locations except those locations at the foci of the focusing lens components, all light impinging on the screen outside of these foci will be absorbed by the black non-reflective areas of the screen and will not be reflected toward the viewer of the screen. In this manner, the amount of reflected light is significantly reduced and picture contrast is improved. In the disclosed invention of the above patents, the preferred method of selectively applying a dark overcoating onto the cylindrical lenses of the front face of the screen is to coat the entire front face of the projection screen with an approximately 2 mil thick layer of dyed photo resist and subsequently to etch the photo resist at the foci of the cylindrical lenses. The precision of dyed photo resist removable afforded by etching minimizes the required tolerance and the size of clear sections at the lens foci thereby darkening the overall appearance of the picture screen. In an alternate method, the black overcoating may be deposited using a mask to selectively coat the front face of the projection screen.

While the above described method has proven to be generally satisfactory in producing a back projection screen having good contrast ratio, applicants have found that the application of the photo resist layer onto the front face of the screen with the layer then being etched at the foci of the cylindrical lenses does not necessarily provide a projection screen in which the projected image is properly focused at each of the etched areas. More particularly, applicants have found that even small differences in projector location used with a particular screen will cause the light from the projector to be focused at different points. Accordingly, a projection screen which is satisfactory for one particular projector location may not produce a uniform image brightness or an image with the best contrast with a different projector location. Accordingly, it is desirable to provide a projection screen which has etched areas precisely positioned to match the particular projector location used with the screen.

Although the two above mentioned patents disclose back projection screens that minimize the distance from screen to projector, e.g., to about 0.433 times the image height, that distance is still a greater distance than people would like to have for displays that are very large. A front projection screen with a ceiling mounted projector of the type commonly used in large viewing areas (auditoriums and sports bars) or in commercial aircraft is physically much more attractive since the throw distance is in front of the screen and does not require a space behind the screen. However, prior art front projection screens have not been capable of giving good contrast in the presence of high ambient light levels. By increasing the gain of the screen, one can somewhat improve the contrast but at the loss of viewing angle. An ideal front projection screen would appear as a solid black surface in the presence of reflected light but would still reflect all of the light that falls on the screen from a projector. Accordingly, it would be desirable to have a front projection screen which minimizes reflected light from external sources while maximizing reflected light from a projector.

SUMMARY OF THE INVENTION

In accordance with one embodiment of the present invention, there is provided a back projection screen for a pictorial display device in which the screen is formed as a composite structure having refracting lens components and focusing lens components integrally formed within the surface of a single projection screen. The focusing lens components are situated along the back face of the projection screen proximate the image to be viewed and the radius of curvature of the focusing lens components are so dimensioned relative to the thickness of the screen that the foci of the focusing lens components are located along the front face of the screen. Refracting lens components are formed in the screen in optical registry with the focusing lens components and the front face of the screen is covered with a positive film material such as Eastman Kodak T-MAX 100 direct positive film. Once the front face of the screen has been coated with the positive coating, a light source is aligned in the same location as that of the projector that will be used to project images on the rear face of the screen. The light source is then activated to project light onto each of the focusing lens components whereby the light is focused by the lens components onto points at the front face of the screen for exposing only the light sensitive positive film at the focal points of the light. The light sensitive material is subsequently developed to leave clear areas at the focal points and generally non-reflective, non-transparent material at all other areas on the front surface. In this form, it can be assured that the clear areas are precisely located at the front face of the screen at those points at which light from a projector positioned in a location corresponding to that of the light source would project the image onto the front face of the screen.

In another form of the invention, there is provided a front projection screen utilizing a lenticular sheet with an array of small lenses on the front surface of the sheet with the thickness of the sheet being the focal length of these lenticulas. Light from a front projector then focuses into small points at the focal point of the lenses on the back side of the screen. If the back side of the screen is painted black except for holes at the focal point of these images, light from any other location in the room will be absorbed by the screen but light from the projector will go through these holes. Note that this particular arrangement is substantially a reverse of the arrangement described above in which the light is projected from the rear of the screen to holes on the front face of the screen. In this front projection system, a fiber optic fiber is positioned at the focal point in each of the holes on the rear of the screen and the fiber is then bent in a 180° arc and brought back into the screen through a small hole in the lenticular sheet between adjacent lenticulas. The fiber then emits this light over the larger angle of roughly 90° from the fiber. While the manufacturing process for this screen would be tedious, the principle illustrated is that one can make a black screen that has high efficiency for light from a particular direction and then reflect that light out into the viewing angle of the viewer.

In another embodiment, a polarized sheet could be placed over the front surface of the front projection screen. The pictorial data is then obtained from the light output from an active matrix liquid crystal projector which is polarized. If the polarization of the polarized sheet on the front surface of the screen has the same polarization as the light from the projector, then the screen will have maximum reflectivity for the projector light. However, since the ambient or room light is not polarized but has random orientation, only about half of the room light will be reflected and the other half will be obstructed by the polarizer. By itself, this process could be used to give a maximum of a factor of 2 improvement in contrast on a white screen.

In still another embodiment of the present invention, a front projection screen is overlayed with a plastic sheet filled with polymer dispersed liquid crystals with a conducting transparent electrode on both sides of the sheet. These forms of sheets are well known in the art and are used in various applications for selectively converting the sheet from transparent to white. The sheet is normally transparent and can be turned to white by the application of voltage across the sheet. By using very small particles for the polymer dispersed liquid crystal and by using relatively high voltages for the electrical pulse applied to the conducting electrodes, the duration of time that the screen can be turned white can be as short as about 1 millisecond. The sheet is coated black on a back side so that when no voltage is applied to the electrodes, the screen will be black by reflected light from the back side of the transparent sheet. When the voltage is applied to the electrode, the screen will turn white during the time that the voltage pulse appears across the sheet. Accordingly, the sheet will have very high reflectivity during the time it is white but will be black for the remainder of the time. The screen using the polymer dispersed liquid crystal sheet is then applied in a system in which the light output from the projectors is pulsed and not continuous. For example, a conventional cathode ray tube projector provides pulse light for a reasonable short duration because of the short persistence of the phosphors on the cathode ray tube. Alternately, solid state lasers have been used as light sources for color active matrix liquid crystal displays in which the lasers are pulsed at a frequency of 60 or 120 Hz. The pulse durations in the laser light source applications is relatively short, for example, a few nanoseconds. Furthermore, the output from lasers can be polarized. When the screen overlayed with the polymer dispersed liquid crystal sheet is pulsed synchronously with the pulsing of the projector, the screen will be white or have a very high reflectivity during the time that the projector is active and will be black for all other times. In a typical application, the screen can be turned white for a time period as short as one millisecond out of every seventeen milliseconds at a pulse repetition rate of 60 Hz so that the contrast ratio is improved by a factor of 17 over a system using a continuously white screen. In addition, if the above described polymer dispersed liquid crystal sheet can be polarized or is overlayed with a film of polarized material, the contrast ratio can be improved by another factor of 2 due to the fact that the projector's light is polarized and the ambient light is not polarized. Still further, the front projection screen using the polymer dispersed liquid crystal sheet is also formed with lenticular lenses or beads commonly used in a beaded screen in front of the sheet to give further contrast improvement. The combination of these devices in a front projection screen yields about a 3% reflectivity for ambient light but about 100% reflectivity for light from the polarized and pulsed projector.

In still another form of the invention, the front projection screen is overlayed with a sheet containing polymer dispersed liquid crystals and the light output for the screen is provided by a cathode ray tube projector. The cathode ray tube projector is scanned in a vertical direction so the light output is not the same at the same time for the full height of the screen. Accordingly, the polymer dispersed liquid crystal sheet is divided into horizontal bands and the bands are sequentially turned white in a scanning process synchronous with the vertical scan rate of the cathode ray tube projector. Using approximately 10 to 30 bands in a conventional size pictorial display screen provides a significant improvement in contrast ratio since a larger part of the screen is black to ambient light during the time that at least one of the bands is actuated for providing reflectivity to the pictorial data from the cathode ray projector.

Still another embodiment of the present invention is a reflective version of the first embodiment described above. In this embodiment a reflective screen is constructed with an overlaying reflective quarter wave film, i.e., a film which rotates the plane of polarization 90° for reflected light. A front surface of the screen is covered by a plurality of spherical lenticular lenses with aspect ratio equal to the viewing angle aspect ratio and with focal length equal to twice that of the lens thickness. The lenses are further coated with a polarizing coating which is optically exposed to be clear at the focal point of each respective lens for light emitted from the projector lcoation. In use, light is focused by the lenticular lenses and reflected by the screen to a focal point on the lens surface. Since the polarizing film polarizes light passing through it and since the back plate rotates the plane of polarization by 90°, light that comes from any point other than the projector location is absorbed by the polarizing material at the front surface of the lenses. Light from the projection is transmitted. The screen can be flat or spherical with the flat screen producing a uniform image when viewed from a distance that is relatively large compared to the projection distance. If viewing distance is about equal to projection distance, a spherical screen produces a uniform intensity image over a wider viewing angle.

BRIEF DESCRIPTION OF THE DRAWINGS

For a better understanding of the present invention, reference may be had to the following detailed description taken in conjunction with the accompanying drawings in which:

FIG. 5 illustrates an embodiment of FIG. 4 for use with a scanning projector;

FIG. 6 is a front view of the screen of FIG. 5;

FIG. 7 is an alternate implementation of the screen of FIG. 6;

FIG. 8 is another embodiment of a front projection screen with selective light reflection reduction; and FIG. 9 is another embodiment of the screen of FIG. 8.

DETAILED DESCRIPTION OF THE INVENTION

Figure 1:
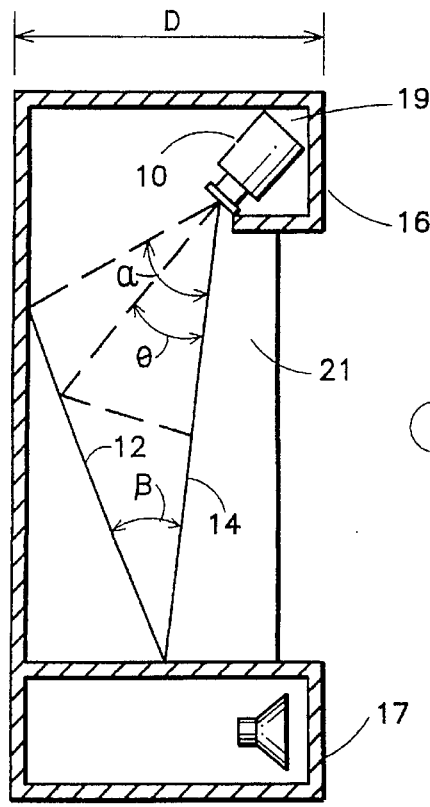
FIG. 1 is an isometric view of a back projection system of the prior art.

Referring now to FIG. 1, there is shown a cross-sectional view of a prior art back projection system which includes a wide angle projector 10 to project an image on a mirrored surface 12 which in turn reflects the image upon the back face of a projection screen 14 to present a viewable picture on the front face of the screen. In order to minimize the depth of the back projection system for a given picture dimension, projector 10 is generally provided with a wide angle lens which produces a projection angle α in the range of 50° to 60°. For optimum centering and brightness employing a projection angle within that range, mirrored surface 12 and projection screen 14 are disposed relative to each other at an angle β which preferably lies in the range of 32.5° to 30°. Projector 10 is situated above and slightly forward of projection screen 14 with the axis of the projector forming an angle φ with the plane of the projection screen equal to one-half the projection angle. The angle β formed between mirrored surface 12 and projection screen 14 generally differs from the angle φ formed by the axis at projector 10 relative to the projection screen except for the maximum projection angle of 60° when both angles φ and β are equal to 30°. For a detailed description of the relationship between the angles α, β and φ, reference is made to the aforementioned U.S. Pat. No. 3,462,214.

The light rays from projector 10 form a 30–60–90 degree right triangle with reflecting surface 12 when a 60° projection angle is employed with projector 10. The rays forming the center of the pictorial display, and therefore being the most observable, impinge at an angle of 60° upon point 12' of mirrored surface 12 with a 60° projection angle and the impinging rays are reflected at a 60° angle relative to the plane of mirrored surface 12 to strike upon the center of the projection screen at an angle of 90°. The orthogonal relationship between the projection screen and the rays impinging upon the back surface of the projection screen minimize the refraction of the screen so that a maximum of brightness is obtainable for a fixed projection wattage. Mirrored surface 12 can be any smooth, non-light absorbing material and preferably is a front reflecting mirrored surface to permit a minimum of loss of light intensity and a minimum of image distortion. The projector 10, mirrored surface 12 and screen 14 are mounted in a cabinet 15 with the projection screen itself disposed at an attitude sloping slightly from the vertical with the top of the screen protruding furtherest forwardly. Although a greater saving in the depth of the overall system could be accomplished by the disposition of the projection screen at a perfectly vertical attitude, such a configuration is not desirable because light reflecting off the front face of a vertical screen reduces the contrast ratio of the image projected on the screen. The base portion 17 of the cabinet structure extends to a distance approximately equal to the protrusion of the upper overhang 19 in order to provide a uniform appearance to the structure and to provide stability to the cabinet. Speakers or other elements can be positioned in the base structure below the screen 14. If the screen 14 is recessed below the overhang 19 and behind the intermediate support size 20 and 21, the contrast ratio will be improved during daylight or high ambient light dealing.

Figure 2:
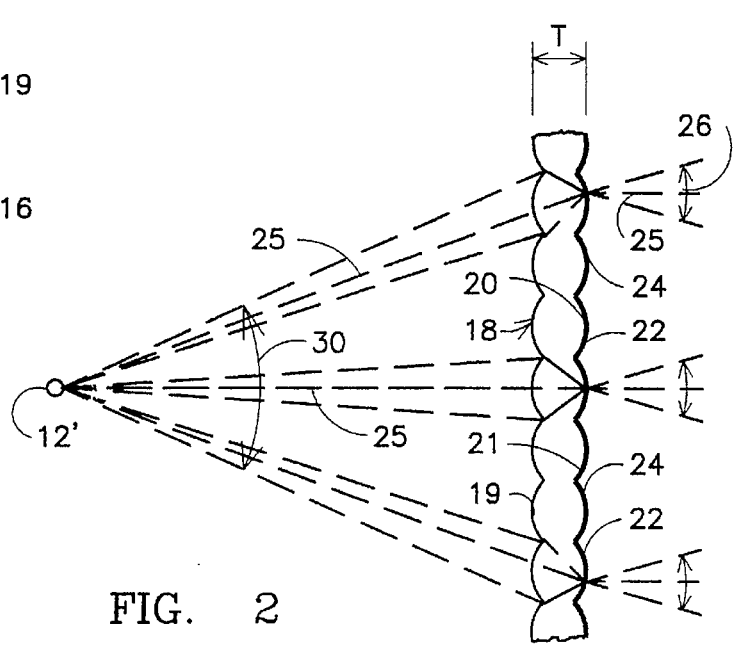
FIG. 2 is an enlarged sectional view of a back projection screen with refracting lens component formed from a portion of a lenticular front surface of the screen.

One form of high gain, back projection screen 14, for use with a wide angle projection lens of projector 10 is shown in FIG. 2. The screen 14 is characterized by a spherically lenticulated back face 28 proximate mirrored surface 12 and a spherically lenticulated front face 30 symmetrically disposed relative to back face 28 so that spherical lenses 29 and 31 along the back and front faces, respectively of screen 14 are aligned in opposition. The screen thickness T and the radial curvature of spherical lenses 29 are dimensioned so that an image reflected from point 12' on mirrored surface 12 is focused upon the surface of front face 30 by spherical lenses 29. In general, spherical lenses 29 and 31 are relatively small having an arcuate span of approximately 10 mils and a radius of curvature of about 7 mils for a 20 mil thick screen, e.g., the radius of curvature of the cylindrical lenses preferably is approximately ⅓ of the thickness of the screen. Each lens is rectangular and has a height to width ratio (aspect ratio) that is the same as that of the height to width ratio of the desired viewing angles. In this embodiment the vertical viewing angle is chosen to be equal to the vertical angle of the projection lens. The horizontal viewing angle must be equal or larger than the corresponding horizontal angle of the projection lens. It is desirable that the entire front face 30 of projection screen 14 be covered with an approximately 2 mil thick dark overcoating 32 at all locations except for clear sections 34 situated at the foci of lenticulas 29. Each of the clear sections 34 along spherical lenses 31 are desirably positioned at a location intersected by an unrefracted center ray 35 projected from point 12' on mirrored surface 12 through the center of the directly opposed back spherical lens 29 and therefore the location of clear sections 34 are arcuately progressively displaced relative to the center of the particular spherical lens 31 with which the section is associated as the distance from the cylindrical lens to the center of the screen increases. Each of clear sections 34 is desirably situated upon a slightly different arcuate segment of spherical lenses 31 and the clear sections form a stepped zone lens configuration relative to the projected light rays from point 12' on mirrored surface 12. The clear sections therefore function to refract the impinging light rays focused upon them by spherical lenses 29 thereby collimating center light rays 35 on the viewing side of the screen preferably at an angle perpendicular to the plane of the screen. Optical registration of clear sections 34 and spherical lenses 29 is accomplished by locating clear sections 34 at the foci of spherical lenses 29. The refraction of the light rays passing through the screen inhibits the formation of areas of excessive lumination at the center of screen 14 and permits clear sections 34 to be situated at relatively obscure locations along the curved surface of the screen. By focusing spherical lenses 29 upon the front surface of the projection screen, the viewing angle is maximized for a given screen thickness.

One method of selectively applying a dark overcoating 32 onto spherical lenses 31 is to coat the entire front face of the projection screen 14 with an approximately 2 mil thick layer of dyed photo resist 32 and subsequently to etch the photo resist at the foci of spherical lenses 29. Another method of deposition of the dark overcoating 32 utilizes a mask to selectively coat front face 30 of projection screen 14. Applicant has found that neither of these methods produce optimal contrast ratio for the screen 14 if projectors are used with different points of origin 12 producing a different apparent origin of the light rays 35 and thus resulting in the light rays 35 focusing at different or slightly displaced areas 24 on the outer lenticular surfaces 31. As a result, a screen 14 which may produce an ideal contrast ratio for one projector location will have significantly reduced or deteriorated contrast ratio when a projector is positioned in the system at a different location. This misconvergence problem is overcome in the present invention by exposing a positive film coating 32 from a light source at a location corresponding to the projector location. It should be noted that projector location is the location of apparent origin of light from the projector and such origin varies with different types of projectors so that such origin may change even though the projector housings are in the same physical location. In particular, and referring to FIG. 2A, in the practice of applicant's invention, the coating 32 is an Eastman-Kodak T-MAX 100 direct positive film coating which is placed on the surface of the lenticulas 31 as a solid film. A light source 37 is then aligned in the same location as will be used for a projector that will illuminate the screen. The light source is activated to shine its light onto the rear face of the screen 14 so that the light is focused onto corresponding foci or focal points 34 of the lenticular elements 30. The light thereby focuses on the precise location on the front face of the lenticular elements 31 as will occur when an image is projected onto the rear surface of the screen 14 by a projector aligned at the same location as the light source 37. The light sensitive positive film material is then treated in a conventional chemical process whereby the areas of the film that are not exposed to light from the light source are left black on the face of the screen 14 and those areas which were exposed to light from the light source are chemically removed thereby providing openings 24 precisely at the locations on the front face of the screen 14 at which light from the projector will be focused. More particularly, when the light source 37 is activated to shine its light onto the lenticular elements 29 and 31 of the screen 14, the light is focused by the lenticular elements onto the locations on the front face of the screen 14 at which light from a projector in the same location as the light source will be focused. Accordingly, only that portion of the positive film coating at the exact focal points will receive light and only those portions of the film exposed to the light from the light source 37 will be removed by the chemical processing. This process thus assures that the picture image from the projector 10 will focus exactly at the openings 24 on the front face of the screen 14. As noted above, the film 32 for this process is a direct positive film and the manner in which this film is chemically treated is well known in the art.

Figure 3:
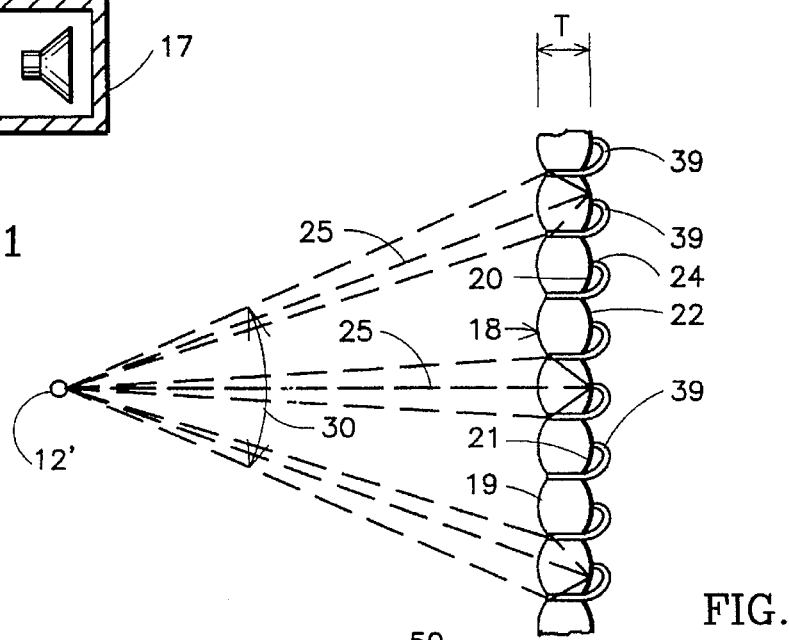
FIG. 3 illustrates a fiber optic implementation of one form of the present invention using the screen structure of FIG. 2.

The above described process for the rear projection screen may also be used in a front projection screen in which the image is projected from the front of the screen rather than from the rear. However, in the particular embodiment shown in FIG. 3, the screen is reversed in orientation from that shown in FIG. 2. More particularly, the front part of the screen and the rear of the screen are reversed with regard to FIG. 2. In the embodiment of FIG. 3, the light is focused from the front projector 38 onto the small openings 34 in the black film so that if one were on the side of the screen at which the black film is located, one would observe the image being projected by the projector 10. However, since the viewer is now positioned at the front of the screen, i.e., on the same side of the screen as the projector, the image must be transferred from the rear side of the screen back to the front side of the screen. For this purpose, a plurality of optical fibers 39 are attached to the screen 14 with one end of the optical fibers being aligned with the openings 24 in each of the lenticular elements. The optical fiber 39 is preferably a short fiber and merely curves from the center of the lenticular element back to the screen in a position between adjacent lenticular elements. The fiber optics fiber 39 brings the light around and back through the screen so that it is then emitted over a larger angle of roughly 90° from the fiber. While in this particular instance it is desirable to provide a pictorial device in which the image is displayed in the same direction from which the projection occurs, it will be appreciated that this fiber optic technique could be utilized to transfer the image to any other screen at any other desirable orientation. In either the embodiment of FIG. 2 or FIG. 3, contrast ratio can be further improved by addition of an overlaying film of light polarizing material on screens used with projectors in which the projected light is polarized if the film has the smae polarization as the projected light. Since ambient light is randomly polar, about one-half of the ambient light will be blocked by the polarized film.

Figure 4:
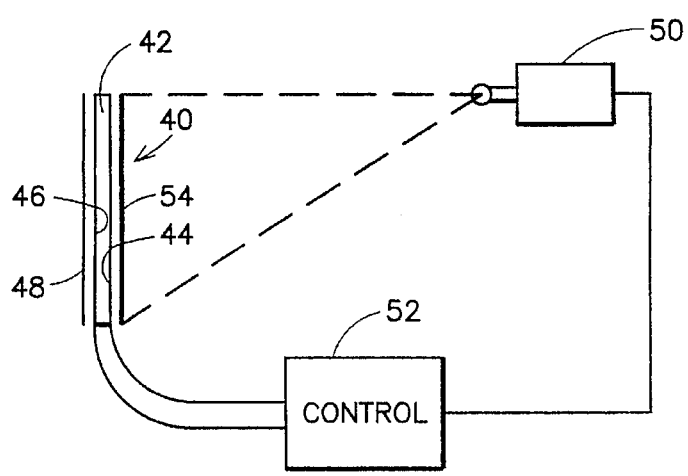
FIG. 4 illustrates a functional arrangement of components for improving contrast ratio of a projection screen by opaquing the screen during inter-image intervals.

FIG. 4 illustrates another form of front projection pictorial device in which the screen 40 comprises a plastic sheet 42 filled with polymer dispersed liquid crystals. A pair of electrically conducting transparent electrodes 46 and 44 are positioned on both sides of the sheet 42. The back of the sheet 42 may be covered with a black film 48 such as by painting the back of the sheet with a black non-reflective paint. The images are projected onto the screen 40 from a light valve projector 50 with a pulsed light source such as, for example, a projector with a solid state laser light source used with a color active matrix LCD panel. A controller 52 synchronizes the operation of the projector 50 with the application of voltage to the electrodes 44 and 46. In the case of an active matrix LCD display, the entire image is projected at one time at a synchronized rate such as 60 or 120 Hz. When no image is being projected by the projector 50, the electrodes are de-energized so that the plastic sheet 42 is transparent. At this time the only appearance of the screen from the projector side is of the black paint or black film 48 on the rear side of the sheet 42. Accordingly, the screen will appear black at any time that the projector is in an off condition. At the time that the projector 50 is energized and an image is projected on to the screen 40, the electrodes 44 and 46 are concurrently energized turning the film 42 to a white color so that the image is then reflected towards a viewer on the same side of the screen as the projector. If the projector is operated at a 60 Hz rate, the screen can be turned to its white configuration by energizing the electrodes 44 and 46 for one millisecond out of every 17 milliseconds. During the remaining 16 milliseconds of each time period, the plastic sheet 42 is transparent so that only the black film 48 is visible at the front surface of screen 40. Consequently, the ambient room light impinging on the screen 40 is absorbed rather than reflected. Since reflection only occurs during one millisecond out of every 17 milliseconds, the contrast ratio is improved by a factor of 17 over the system using a continuously white screen.

A further improvement can be attained in the system of FIG. 4 if a polarized film 54 is applied to the front surface of sheet 42 and the light from the projector 50 is polarized. In this condition, even during the one millisecond time period during which light is reflected from the screen 40, the polarized film will reject approximately 50% of the ambient light since it is not polarized while reflecting 100% of the polarized light from the projector 50. Accordingly, an additional gain of about two in contrast ratio will be gained by using the polarized film 54. A still further improvement can be obtained by adding a screen gain with lenticular lenses or beads such as in a conventional beaded screen on the front surface of the polymer dispersed liquid crystal sheet 42 to give further contrast improvement. The screen 40 if incorporating a polarized sheet 54 and a beaded surface would result in about 3% reflectivity for ambient light but a screen gain of 2 or 3 for light from the projector 50.

In a system using a conventional cathode ray tube projector 51, such as is illustrated in FIG. 5, the light output from the projector is essentially a scanning line output which scans in a vertical direction from top to bottom of the screen. Accordingly, the light output is not the same at the same time for the full height of the screen. A screen 40a which takes advantage of the scanning of the beam in cathode ray tube projector 51 incorporates a polymer dispersed liquid crystal sheet 42a having a solid back electrode 58 and a plurality of horizontal band electrodes 60a–60n positioned along the front surface of the sheet 42a. A black film 48a is placed along the back side of the sheet 42a in the same manner as was done in FIG. 4. Operation of the CRT projector 51 is synchronized with energization of each of the horizontal bands 60. In this instance, the scan across the top of the screen 40a occurs at a time when the first electrode band 60a is energized so that the light for that scan is reflected from the top surface of the screen 40a. As the scan lines move vertically down the screen 40a, the electrodes $60_a$–$60_n$ are sequentially energized so that at each time that the scan occurs the corresponding one of the electrodes 60 is energized whereby light from the projector is reflected back towards a viewer located on the same side of the screen as the projector 51. The screen can be divided into approximately 10 to 30 horizontal bands and provide significant rejection for ambient light.

Referring to FIG. 6, there is shown a schematic representation of a screen 42a. FIG. 6 will help in understanding how the bar electrodes are sequentially energized. If the electrodes are numbered 1,2,3 and 4 starting from the top of the screen and the electrode 1 is assumed to be on, prior to the time at which the scan reaches the area covered by electrode 2, the electrode 2 is gated on turning the area under the electrode to its white color. Immediately after turning electrode 2 on, the electrode 1 is turned off and the scan continues across the electrode 2. After turning off electrode 1, the electrode 3 is turned on followed by turning off of electrode 2. In this manner, it is assured that there is always one electrode which is energized and that that electrode is synchronized with the scan of the CRT so that the image is reflected from that portion of the screen 54 under the active electrode. From a viewpoint facing the screen, the screen appears to have a white strip which moves vertically from the top to the bottom of the screen synchronously with scanning of the screen by the CRT projector 51. Note that polarization can be added to the screen 40a in the same manner as was done with screen 40. Of course, integration by the viewer's eye will make the image appear continuous.

FIG. 7 is a simplified schematic representation of an alternate embodiment of the screen of FIG. 5 in which a moving white strip 66 is positioned on a belt 68 driven in a continuous rotation over a pair of spaced rollers 70. Note that for this embodiment, there are two white strips so that one white strip is always visible on the front face of the belt 68. When one of the rollers 70 is driven by a motor drive 72 operated at a speed synchronous with the scan rate of the CRT projector 51, the white strip will travel vertically downward at the same rate as the scanning of the projector. The effect will be the same as given in FIG. 5 but is achieved by mechanical rather than electrical means. A polarized sheet may also be placed in front of the scanning belt of FIG. 7 to further improve the contrast ratio by reducing the amount of ambient light striking the belt.

Referring now to FIG. 8, there is shown an alternate embodiment of the invention in which the system is adapted for front projection. The screen 80 comprises a back member 82 with a front reflective surface overlaid by a quarter wave plate 84. Plate 84 is a film type material which rotates the plane of polarization of light passing through it which, for reflected light, is a rotation of 90°. A layer 86 of spherical lenticular lenses 88 overlays the plate 84 and a layer 90 of polaroid film overlays the array of lenses 88. It should be noted that the term "spherical" used here and in other description in this application is not intended to refer only to perfectly spherical shapes but to also include oval and eliptically shaped lenticular elements. The lenticular lens sheet has a thickness of one-half the focal distance of the lenses. The polaroid film is a conventional coating which is applied in the form of a photosensitive film in an unexposed state. Light originating from a source at 92 is projected onto the screen 80 and is reflected back to the focal point of each lens 88. The focused light activates the polaroid film 90 so that it can be cleared to be transparent at the lens focal point indicated at 94. At all other locations the polaroid film layer 90 is treated or fixed to maintain its polarizing characteristics.

In the operation of the screen system of FIG. 8, light originating at source location 92, indicated by rays 96, passes through film layer 90 and is reflected back from member 82 to the focal point of each lens 88. Since the film layer 90 is transparent at each focal point, this reflected light is visible at the front of the screen. Light originating from other locations is polarized as it passes through layer 90 and its plane of polarization is then rotated by 90° by plate 84. This light is reflected from member 82 back to other locations on surfaces of lenses 88, i.e., locations other than cleared locations 94, where the polaroid layer 90 blocks the reflected polarized light due to the rotated plane of polarization. Projector light thus has a high degree of reflection whereas light from other locations is substantially blocked by the polaroid layer 90.

If the projector 98 utilizes an LCD (liquid crystal display) light valve emitting polarized light, the orientation or plane of polarization should be the same as that of film layer 90. Light from the projector will then be distributed with an aspect ratio of viewing angle equal to that of the lenses 88. The radius and lens size is the same as for the embodiment of FIG. 2 but the thickness of the lens layer 86 is one-half that of FIG. 2. Furthermore, manufacturing is easier since registration of lenses on two spaced surfaces is not required.

FIG. 9 illustrates a further embodiment of the screen of FIG. 8 in which the screen 80 is formed with a spherical surface with radius equal to projection distance. This embodiment makes the viewing area uniform in extent at the projection distance and produces a more desirable display at or about that distance. In comparison, the embodiment of FIG. 8 provides a uniform viewing area if viewed from a distance that is relatively large with respect to the projection distance.

One method of forming the spherical screen is to hermetically seal the edges of screen 80 to boxlike receptacle 100 having air-tight construction. Air can then be drawn out of the enclosure using conventional means such as blower 102 to cause ambient air pressure to collapse screen 80 into a spherical configuration.

While the invention has been described in what is presently considered to be its preferred embodiments, various modifications will become apparent to those skilled in the art. It is intended therefore that the invention not be limited to the embodiments disclosed but be interpreted within the full spirit and scope of the appended claims.

What is claimed is:

1. A front projection screen for pictorially displaying upon a front face of the screen an image projected onto the front face from a projector comprising:

a backing member having a front reflective surface;

a polarization rotation plate overlaying said reflective surface for rotating the plane of polarization of light reflected from said surface;

a sheet of lenticular lenses overlaying said polarization rotation plate; and a polarizing film overlaying said sheet, said film having non-polarizing segments at a focal point of each of said lenticular lenses.

2. The projection screen of claim 1 wherein each of said lenticular lenses has a generally spherical configuration.

3. The projection screen of claim 1 wherein said screen is substantially flat.

4. The projection screen of claim 1 wherein said screen is formed as a generally spherical segment.

5. The projection screen of claim 4 wherein said spherical segment has a radius equal to approximately the distance from the projector to said segment.

6. The projection screen of claim 1 wherein said lenticular lenses have a focal length of about twice the thickness of said sheet of lenticular lenses.

7. The projection screen of claim 1 wherein said polarization plate is a quarter wave plate for rotating the plane of polarization by 90°.

8. The projection screen of claim 1 wherein said lenses have a radius of between about 0.007 and 0.03 inches.

9. The projection screen of claim 1 wherein said lenses have a generally elliptical configuration.

10. The projection screen of claim 4 and including a housing, edges of said screen being hermetically sealed to said housing, and means for lowering air pressure in said housing whereby external ambient air pressure urges said screen into said generally spherical configuration.

11. The projection screen of claim 10 wherein said air pressure lowering means comprises a blower in said housing.

* * * * *